(No Model.)
R. E. BOSCHERT.
SCREW PRESS.
No. 368,057. Patented Aug. 9, 1887.
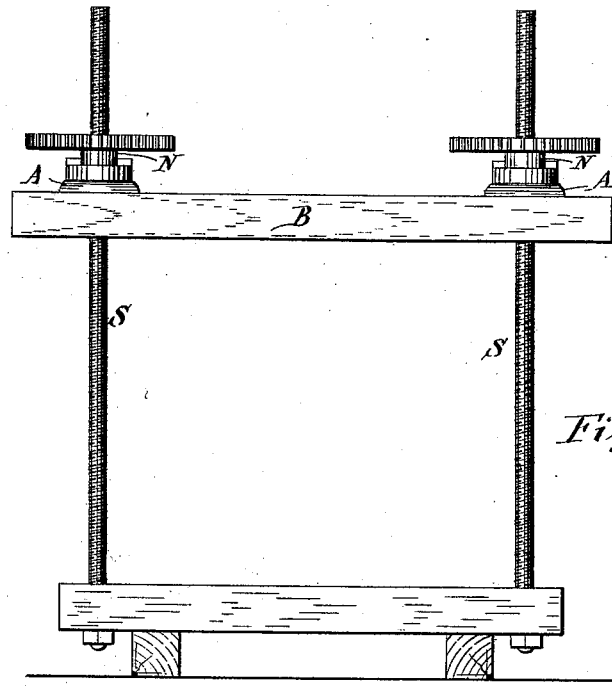
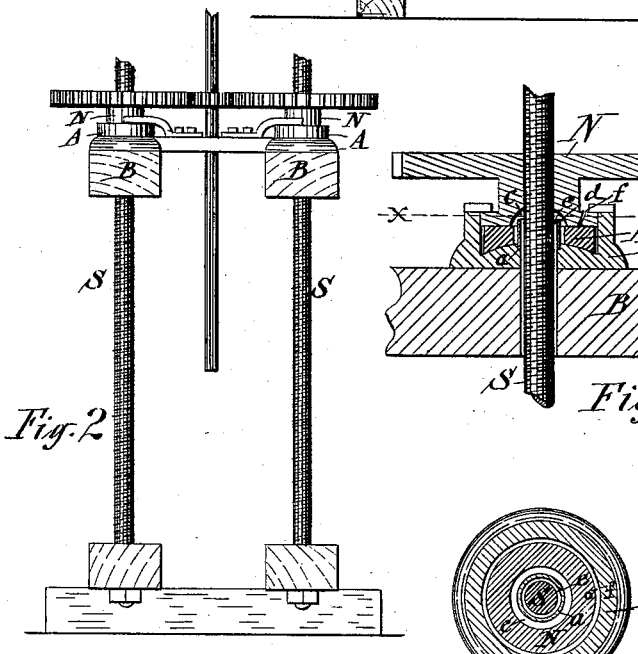
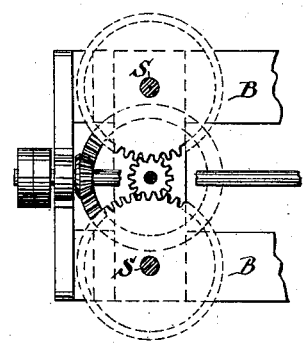
WITNESSES:
A. F. Walz,
C. Bendixon
INVENTOR
Rufus E. Boschert
BY
Duell, Laass & Duell
ATTORNEYS.

UNITED STATES PATENT OFFICE.

RUFUS E. BOSCHERT, OF SYRACUSE, NEW YORK.

SCREW-PRESS.

SPECIFICATION forming part of Letters Patent No. 368,057, dated August 9, 1887.

Application filed April 25, 1887. Serial No. 235,992. (No model.)

*To all whom it may concern:*

Be it known that I, RUFUS E. BOSCHERT, of Syracuse, in the county of Onondaga, in the State of New York, have invented new and useful Improvements in Screw-Presses, of which the following, taken in connection with the accompanying drawings, is a full, clear, and exact description.

This invention relates more particularly to the class of screw-presses in which the nuts work on the upper ends of stationary screws and bear on washers interposed between said nuts and top of the follower.

The purpose of this invention is to effectually lubricate the bearings of the nuts on the washers; and to that end my invention consists in the novel construction and combination of parts, as hereinafter described, and specifically set forth in the claims.

In the annexed drawings, Figure 1 is a front elevation of a press embodying my improvements. Fig. 2 is a side elevation of the same. Fig. 3 is a top plan view of one side of the press, with portion broken away to better illustrate the means for transmitting motion to the nuts. Fig. 4 is an enlarged vertical transverse section of my invention; and Fig. 5 is a horizontal section on line $x\ x$, Fig. 4.

Similar letters of reference indicate corresponding parts.

B represents the follower of the press; S S, the screws; N N, the nuts or gear-wheels, with screw-threaded eyes in the hubs working on said screws; A A, the bearing-plates mounted on the follower, and A' A' the washers interposed between the nuts and bearing-plates in the usual manner. The bearing-plates A A are formed with convexed top surfaces, and the washers A' A' are provided with corresponding concave bottom surfaces, to allow the said washers, with the nuts or wheels riding thereon, to move laterally and accommodate themselves to any deflection the follower may be subjected to, and thus obviate binding the screws.

In order to permit of properly lubricating the bearings of the nut and washer, I secure to the top of the bearing-plate A a sleeve, $a$, which surrounds the screw, and is of greater diameter, so as to allow the screw to move laterally. The sleeve extends through the washer A' and a short distance above the same, to form an annular dam, $d$, around the top of the washer, as illustrated in Fig. 4 of the drawings. The under side of the hub of the wheel or nut N is formed with an annular cavity, $c$, to accommodate the dam $d$. A channel, $f$, extends through the nut to permit of introducing the lubricant between the nut and washer.

The sleeve $a$ is fitted tightly to the bearing-plate A, so as to prevent the lubricant escaping from between the washer and bearing-plate into the hole of said bearing-plate through which the screw passes; hence the sleeve $a$ retains the lubricant in the cup-shaped bearing-plate A, so as to effectually lubricate the bearings.

I do not limit my described invention to its application to the screw, its nut, and washer, as it is obvious the said lubricating devices are also applicable to the steps of upright shafts.

Having described my invention, what I claim as new, and desire to secure by Letters Patent, is—

1. In combination with a vertical shaft and a stationary bearing around the said shaft, a circumferential dam arising from said bearing, and a wheel on said shaft provided with an annular cavity in the under side of the hub and over the aforesaid dam, substantially as and for the purpose set forth.

2. In combination with the follower, screw, and nut, a cup-shaped bearing-plate on the follower, a washer interposed between said bearing-plate and nut, a dam projecting above the top of the washer surrounding the screws, and an annular cavity in the under side of the nut and over the aforesaid dam, substantially as and for the purpose set forth.

3. In combination with the cup-shaped bearing-plate A, washer A', screw S, and the nut N, provided with a lubricating-channel and an annular cavity, the sleeve $a$, of greater internal diameter than the diameter of the screw, and secured at its base tightly to the top of the bearing-plate A, and extending through and above the washer A', and to the annular cavity $c$, formed in the under side of the nut, substantially as described and shown.

In testimony whereof I have hereunto signed my name and affixed my seal, in the presence of two attesting witnesses, at Syracuse, in the county of Onondaga, in the State of New York, this 23d day of April, 1887.

RUFUS E. BOSCHERT. [L. S.]

Witnesses:
C. BENDIXON,
H. P. DENISON.